United States Patent
van Scheltinga et al.

(10) Patent No.: US 11,455,176 B2
(45) Date of Patent: Sep. 27, 2022

(54) SELECTING CONTENT TO RENDER ON DISPLAY OF ASSISTANT DEVICE

(71) Applicant: Google LLC, Mountain View, CA (US)

(72) Inventors: Andrea Terwisscha van Scheltinga, Zurich (CH); Rajat Paharia, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 66 days.

(21) Appl. No.: 16/621,987

(22) PCT Filed: Jan. 4, 2019

(86) PCT No.: PCT/US2019/012347
§ 371 (c)(1),
(2) Date: Dec. 12, 2019

(87) PCT Pub. No.: WO2019/136248
PCT Pub. Date: Jul. 11, 2019

(65) Prior Publication Data
US 2020/0125377 A1    Apr. 23, 2020

Related U.S. Application Data

(60) Provisional application No. 62/614,332, filed on Jan. 5, 2018.

(51) Int. Cl.
*G06F 9/451*    (2018.01)
*G06F 16/2457*    (2019.01)
*G06F 1/3231*    (2019.01)

(52) U.S. Cl.
CPC ............ *G06F 9/451* (2018.02); *G06F 1/3231* (2013.01); *G06F 16/24575* (2019.01); *G06F 16/24578* (2019.01)

(58) Field of Classification Search
CPC .......................... G06K 9/00221–00315; G06K 9/00335–00355; G06K 9/00362–00389;
(Continued)

(56) References Cited

U.S. PATENT DOCUMENTS

2003/0098892 A1* 5/2003 Hiipakka ............ H04M 1/7243
715/846
2010/0317406 A1 12/2010 Shigeta
(Continued)

FOREIGN PATENT DOCUMENTS

CN    102253828    11/2011
CN    108028965    5/2018
(Continued)

OTHER PUBLICATIONS

European Patent Office; Communication Pursuant to Article 94(3) EPC issue in Application of Ser. No. 19703417.6; 7 pages; dated Sep. 3, 2020.
(Continued)

*Primary Examiner* — David S Posigian
(74) *Attorney, Agent, or Firm* — Middleton Reutlinger

(57) ABSTRACT

Techniques are described related to selecting content to display using a standalone multi-modal assistant device. In various implementations, an unidentified user may be detected as co-present with a standalone multi-modal assistant device equipped with a display. Based on the detecting, in various implementations, a plurality of data items targeted at one or more registered users may be obtained. The one or more registered users may have accounts accessible to an automated assistant that operates at least in part on the standalone multi-modal assistant device. The plurality of data items may be obtained based on the accounts of the registered users. The plurality of data items may be ranked based on various signals, such as registered user-related and
(Continued)

non-registered user-related priorities. Graphical information may be rendered on the display indicative of the ranked plurality of data items.

18 Claims, 8 Drawing Sheets

(58) Field of Classification Search
CPC ............... G06K 2009/00322–00328; G06K 2009/00395; G06F 3/011–013; G06F 3/167; G06F 9/451; G06F 3/048; G06F 16/24575; G06F 16/24578; G06F 1/3231; G06F 21/44; H04N 21/44218; G10L 15/22–222; G10L 2015/221–228; G06V 40/16–197; G06V 40/20–28; G06V 40/10–117
See application file for complete search history.

(56) References Cited

U.S. PATENT DOCUMENTS

| | | | |
|---|---|---|---|
| 2011/0283237 A1 | 11/2011 | Hayakawa | |
| 2014/0040748 A1* | 2/2014 | Lemay | G06Q 10/107 |
| | | | 715/728 |
| 2014/0075385 A1* | 3/2014 | Wan | G06Q 30/0601 |
| | | | 715/812 |
| 2015/0169696 A1* | 6/2015 | Krishnappa | G06F 16/27 |
| | | | 707/722 |
| 2016/0042735 A1* | 2/2016 | Vibbert | G10L 15/1822 |
| | | | 704/257 |
| 2017/0047064 A1* | 2/2017 | Kirihara | G06F 3/04842 |
| 2017/0242657 A1 | 8/2017 | Jarvis et al. | |
| 2017/0278480 A1* | 9/2017 | Sung | G07F 17/3209 |
| 2017/0289766 A1* | 10/2017 | Scott | H04W 4/023 |
| 2018/0157397 A1* | 6/2018 | Freeman | G06F 3/167 |
| 2018/0367862 A1 | 12/2018 | Horii et al. | |
| 2019/0065975 A1* | 2/2019 | White | G06F 7/08 |

FOREIGN PATENT DOCUMENTS

| | | |
|---|---|---|
| EP | 2925005 | 9/2015 |
| JP | 2008167132 | 7/2008 |
| JP | 2011242943 | 12/2011 |
| JP | 2015046818 | 3/2015 |
| JP | 2017123564 | 7/2017 |
| WO | 2017057010 | 6/2018 |

OTHER PUBLICATIONS

International Search Report and Written Opinion issued is Application No. PCT/US2019/012347 dated Mar. 22, 2019 2019.
European Patent Office: Summons to Attend Oral Proceedings Pursuant to Rule 115(1) EPC, dated Jun. 29, 2021. 10 pages.
Intellectual Property India; Examination Report issued in Application No. 202027028401; 8 pages; dated Nov. 30, 2021.
European Patent Office; Brief Communication issued in Application No. 19703417.6; 7 pages; dated Dec. 2, 2021.
Japanese Patent Office; Notice of Reasons for Rejection issued in Application No. 2020537174; 12 pages; dated Aug. 23, 2021.
Japanese Patent Office; Notice of Reasons of Rejection issued in Application No. 2020-537174, 13 pages, dated Apr. 11, 2022.
Korean Intellectual Property Office; Notice of Office Action issued in Application Ser. No. KR10-2020-7022605; 21 pages; dated May 11, 2022.

* cited by examiner

SELECTING CONTENT TO RENDER ON DISPLAY OF ASSISTANT DEVICE

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users" or, in the context of a meeting, "participants") may provide commands, queries, and/or requests (collectively referred to herein as "queries") using free form natural language input which may be vocal utterances converted into text and then processed, and/or by typed free form natural language input.

Standalone voice-responsive speakers that provide users with the ability to vocally engage with an automated assistant are becoming more commonplace in homes and in businesses. These devices typically include few if any hardware input mechanisms, other than perhaps a mute button, a touch-sensitive interface for adjusting volume, etc. A goal of these speakers is to allow users to vocally engage with automated assistants with ease, without requiring the users to physically interact with user interface elements such as a keyboard or mouse, to perform a variety of tasks, such as playing music, setting up reminders, performing searches (e.g., to obtain specific information), requesting weather reports, setting timers, controlling smart home devices (e.g., lights, thermostat, lock, etc.), setting alarms, creating lists (e.g., shopping lists), ordering goods and/or services, and so forth. In many ways, standalone voice-responsive speakers often function very much like a human personal assistant.

Conventional standalone voice-responsive speakers typically lack full-fledged displays. At most they tend to include relatively simply visual output mechanisms, such as light-emitting diodes, etc., that are capable of utilizing rudimentary colors and/or animation to convey simple messages. The next generation of standalone voice-responsive speakers may include more robust visual output mechanisms, such as a display or even a touchscreen display. These devices will be referred to herein as "standalone multi-modal assistant devices," as opposed to standalone voice-responsive speakers. As is the case with conventional standalone interactive speakers, standalone multi-modal assistant devices may be designed to be interacted with vocally, and typically will not include keyboards, mice, or other complex physical input components. Some, however, may include touchscreens.

In keeping with the typical function served by a standalone voice-responsive speaker—akin to a human personal assistant that provides general assistance—care should be taken when populating a display of a standalone multi-modal assistant device with content. For example, some standalone multi-modal devices may activate the display in response to detection of an unidentified person nearby. Before the co-present person is identified (e.g., using voice recognition), it may not be clear what content—which could include content targeted towards or otherwise controlled by one or more specific registered users (hereinafter referred to as "targeted content")—should be presented on the display. And after the targeted content is displayed, the person may then be identified. This raises the question of whether content targeted towards other registered users should continue to be displayed, or whether the display should be limited to content targeted towards the identified person. In some cases the person may interact with the content, e.g., by swiping it away (i.e. dismissing it), prior to being identified. This raises the question of whether the dismissed content should continue to be presented to other people, whether they be unidentified or identified as different users.

SUMMARY

Techniques are described herein for selecting content to display using a standalone multi-modal assistant device. In various implementations, a standalone multi-modal assistant device may activate its display, e.g., transition the display from an inactive state (e.g., sleep) to an active state, in response to detecting a person nearby. A standalone multi-modal assistant device may detect people nearby using various technologies, such as cameras, microphones, passive infrared ("PIR") sensors, signals emitted by devices (e.g., mobile phones, smart watches) carried by people, etc.

Various content may be rendered on the display upon activation. In some implementations, general content not targeted towards a particular user, such as a weather forecast, general news items, traffic reports (when not selected for a particular user's scheduled travel route), etc., may be rendered. Additionally or alternatively, in some implementations, one or more users may have accounts (e.g., online profiles) that are registered with the automated assistant that operates at least in part on the standalone multi-modal assistant device. By virtue of this registration the automated assistant may have access to content targeted towards the individual registered users, such as content under the registered users' control. This targeted content, which may include one or more distinct data items, may be presented on the display, e.g., similar to how the automated assistant may present this content to the registered users audibly using natural language output. In this manner, content may be presented without requiring additional user interactions with the device, thereby reducing computational load in interpreting and responding to such interactions as well as improving the speed and efficiency by which the content may be accessed.

Data items, whether general purpose or targeted towards specific registered users, may be displayed in various ways. In some implementations, data items may be represented by graphical elements such as "cards" or "tiles" similar to those rendered on smart phones, tablets, smart watches, etc. Some cards/tiles may be interactive, e.g., to launch a software interface usable to modify data items associated with the card/tile, to obtain additional information, to mark the card/tile as highly important, etc. Cards/tiles additionally or alternatively may be dismissed, e.g., by being swiped away on the display (which may be a touchscreen). In some implementations, multiple cards/tiles may be combined, e.g., into a graphical "bin," by swiping one card/tile onto another. Data items may be presented visually in other ways as well, such as using pop-up windows, "ticker-style" readers (e.g., at the top or bottom of the display), etc.

When the display of the standalone multi-modal assistant device is initially activated, in many cases it may not yet be known which registered user is co-present with the device, or even if the co-present person is a registered user. Accordingly, in some implementations, only general purpose data items (described previously) may be presented as graphical elements, e.g., to protect registered users' privacy. However, in a household or business scenario, it may be the case that individual user privacy is not as critical, and in some cases it may even be desirable that registered users see content targeted towards other registered users (e.g., so that one family member knows that the other family member is at a meeting). Accordingly, in some implementations, a plurality of data items targeted at a plurality of registered users may be obtained, e.g., from online resources associated with the registered users' accounts, and rendered as graphical elements on the display. In some implementations, graphical elements representing these targeted data items may be rendered in combination with graphical elements representing general purpose data items. In other implementations, graphical elements representing the targeted data items may be rendered alone.

In some implementations, the targeted and/or general purpose data items may be ranked prior to being displayed as graphical elements. Data items may be ranked based on various criteria, such as priorities assigned to the data items. In various implementations, data items may be assigned priorities manually, e.g., by registered users, or automatically, e.g., based on a date and/or time associated with the data items. For example, a data item associated with a first upcoming event that occurs tomorrow may be assigned a higher priority than another data item associated with a second upcoming event that occurs in a week.

In some implementations, priorities may be registered user-related or non-registered user-related. Registered user-related priorities may have more influence on ranking data items, particularly targeted data items, when an identity of a person interacting with the standalone multi-modal assistant device is known. Non-registered user-related priorities, such priorities assigned to data items based exclusively on upcoming dates associated with the data items, may more heavily influence ranking when the person co-present with the standalone multi-modal assistant device is unidentified.

For example, suppose a registered user is detected in proximity to a standalone multi-modal assistant device. Suppose further that the standalone multi-modal assistant device is able to identify the registered user immediately or relatively quickly. This may occur, for instance, because the registered user's presence was detected from their uttering an invocation phrase for the automated assistant (e.g., as they walked into the room), or because the registered user's mobile phone emits a signal that was used both to detect their presence and to identify them.

In this scenario, the standalone multi-modal assistant device, by way of the automated assistant operating at least in part thereon, knows the registered user's identity when its display is activated. That means the standalone multi-modal assistant device is immediately able to rank targeted data items based on the fact that the particular registered user is present. Consequently, data items that are targeted specifically towards the registered user may be ranked more highly than, say, general purpose data items and/or data items targeted towards different registered users.

Now, suppose the registered user swipes away a graphical element representing a general purpose data item or a data item that is targeted towards a different registered user. If the same registered user were to leave and then come back later for a second session (and be identified by the standalone multi-modal assistant device), graphical elements representing data items may once again be rendered on the display. However, during this second session, the swiped-away data item would likely not be rendered as a graphical element on the display with other graphical elements because the registered user previously indicated disinterest.

Suppose the swiped-away data item was targeted towards a different, second registered user (e.g., the first registered user is a husband and the second registered user is a wife). Suppose further that the second registered user is identified as co-present with the standalone multi-modal assistant device sometime after the first registered user swiped away the data item targeted at the second registered user. In some implementations, the graphical element representing the swiped-away data item may be presented to the second registered user, even though the first registered user previously dismissed it, because the data item was targeted at the second user. In general, this functionality eliminates or reduces the chance that registered users will miss content specifically targeted to them because others swiped it away. For instance, in a similar scenario in which an unidentified person swipes away a graphical element representing a data item targeted towards a specific registered user, if the specific registered user later is identified as co-present with the standalone multi-modal assistant device, the swiped-away content may be presented once again.

These example use cases are not meant to be limiting. A number of other use cases will be described herein.

In some implementations, a method performed by one or more processors is provided that includes: detecting that an unidentified user is co-present with a standalone multi-modal assistant device, wherein the standalone multi-modal assistant device is equipped with a display; and based on the detecting: obtaining a plurality of data items targeted at one or more registered users, wherein the one or more registered users have accounts accessible to an automated assistant that operates at least in part on the standalone multi-modal assistant device, and wherein the plurality of data items are obtained based on the accounts of the registered users; ranking the plurality of data items based on priorities associated with the plurality of data items, wherein the priorities are unrelated to the one or more registered users; and rendering, on the display, graphical information indicative of the ranked plurality of data items.

These and other implementations of technology disclosed herein may optionally include one or more of the following features.

In various implementations, the method may further include transitioning the display from an inactive state to an active state based on the detecting. In various implementations, the detecting comprises receiving natural language input from the unidentified user. In various implementations, the detecting may include receiving a signal from a presence sensor. In various implementations, the presence sensor may include one or more of a camera, a microphone, and a passive infrared sensor.

In various implementations, the method may further include: determining an identity of the unidentified user; and further ranking the obtained data items based on the identity. In various implementations, the determined identity of the user may have greater influence on how the obtained data items are ranked than the priorities that are unrelated to the one or more registered users.

In various implementations, the information indicative of the ranked plurality of data items may include a plurality of graphical elements, each graphical element representing a respective data item of the plurality of data items. In various implementations, the display may include a touchscreen and one or more of the plurality of graphical elements is interactive.

In another aspect, a method may include: detecting that a person is co-present with a standalone multi-modal assistant device, wherein the standalone multi-modal assistant device is equipped with a display; identifying the person as a given registered user of a plurality of registered users with accounts accessible to an automated assistant that operates at least in part on the standalone multi-modal assistant device;

and based on the detecting and the identifying: obtaining a plurality of data items targeted at the plurality of registered users, wherein the plurality of data items are obtained based on the accounts of the registered users; ranking the plurality of data items based on an identity of the given registered user; and rendering, on the display, information indicative of the ranked plurality of data items.

In various implementations, the information indicative of the ranked plurality of data items may include a plurality of graphical elements, each graphical element representing a respective data item of the plurality of data items. In various implementations, the plurality of graphical elements may include a plurality of graphical cards or tiles.

In various implementations, the method may further include: receiving input from the given registered user, wherein the input takes action on a given graphical element of the plurality of graphical elements, and wherein the given graphical element is associated with a data item of the ranked plurality of data items that is targeted towards a different registered user of the plurality of registered users; based on the input, removing the given graphical element from the display; subsequently detecting that another person is co-present with the standalone multi-modal assistant device; identifying the another person as the different registered user; and rendering, on the display, the given graphical element.

In various implementations, the information indicative of the ranked plurality of data items may include a graphical element indicative of an incomplete task initiated by the given registered user with the automated assistant. In various implementations, the graphical element may be selectable to initiate completion of the task via vocal engagement with the automated assistant. In various implementations, the graphical element may be selectable to initiate completion of the task via interaction with a graphical user interface rendered on the display.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
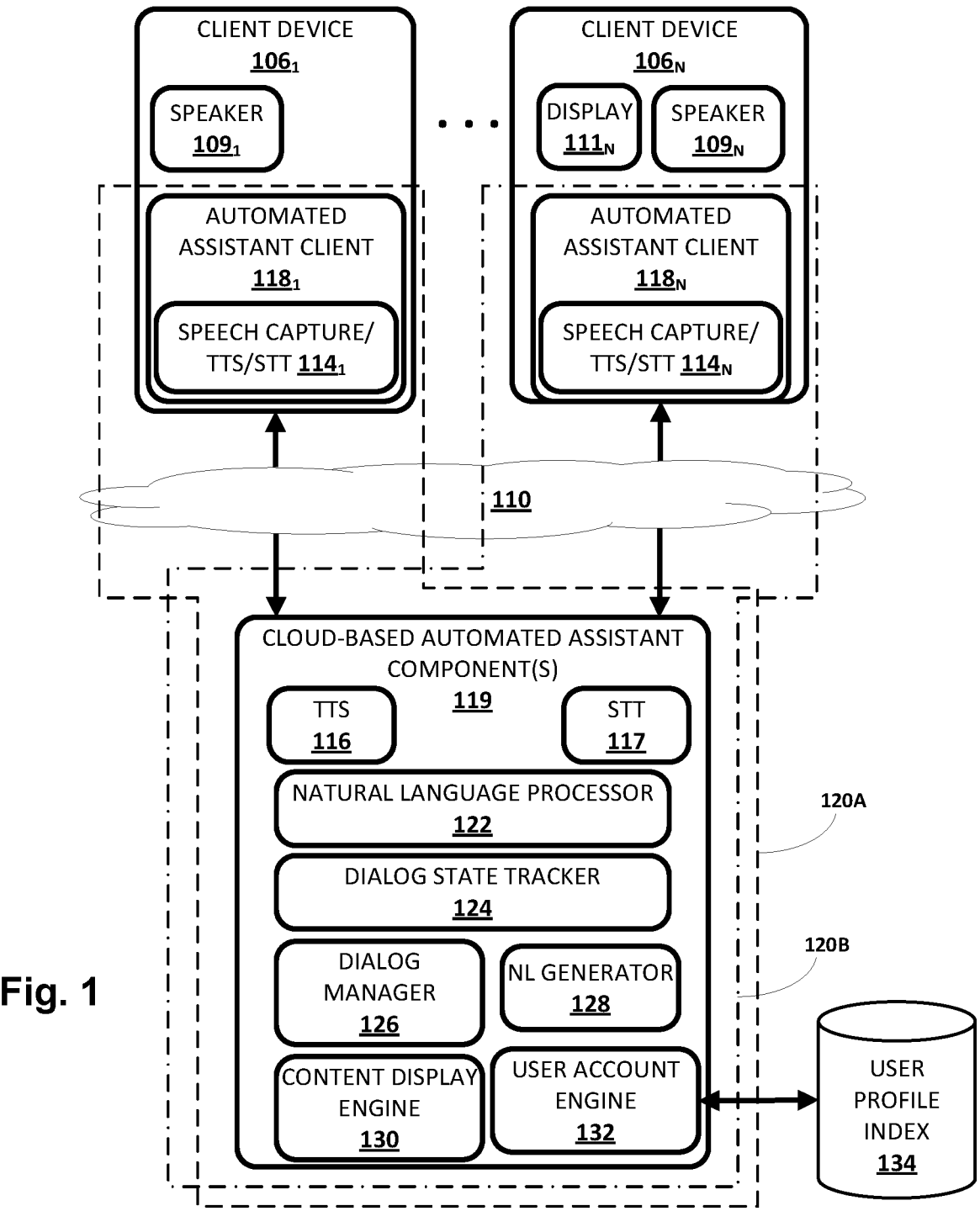
FIG. 1 is a block diagram of an example environment in which implementations disclosed herein may be implemented.

Now turning to FIG. 1, an example environment in which techniques disclosed herein may be implemented is illustrated. The example environment includes one or more client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110.

An instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user refers to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone voice-responsive speaker, a standalone multi-modal assistant device, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

For purposes of the present disclosure, in FIG. 1, first client device $106_1$ is a standalone voice-responsive speaker that includes a speaker $109_1$ through which automated assistant 120A may provide natural language output. As noted above, first client device $106_1$ may include only rudimentary hardware input components, such as volume and/or mute components, and does not include more complex hardware input components such as a keyboard or mouse. A second client device $106_N$ takes the form of a standalone multi-modal assistant device with a speaker $109_N$ and a display $111_N$, and also may lack complex physical input components (aside from display 111 being a touchscreen in some implementations). While techniques described herein will be described in the context of being performed using a standalone multi-modal assistant device such as $106_N$, this is not meant to be limiting. Techniques described herein may be implemented on client devices having other form factors (but still lacking standard keyboards and mice), such as vehicular computing devices that are meant to be interacted with primarily via vocal exchanges.

As described in more detail herein, automated assistant 120 engages in human-to-computer dialog sessions with one or more users via user interface input and output devices of one or more client devices $106_{1-N}$. In the case of standalone multi-modal assistant devices such as client device $106_N$, these input devices may be limited to microphones (not depicted) and display 111 (in implementations in which display 111 is a touchscreen), as well as other passive sensors (e.g., PIR, cameras) that may be used to detect presence of a person nearby. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, the particular user interface input may be user interaction with a hardware button and/or virtual button (e.g., a tap, a long tap), an oral command (e.g., "Hey Automated Assistant"), and/or other particular user interface input.

In some implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/STT module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a dialog state tracker 124, a dialog manager 126, and a natural language generator 128 (which in some implementations may be combined with TTS module 116), and of particular relevance to the present disclosure, a content display engine 130. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 and/or performance of one or more responsive actions by automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-responsive speaker or standalone multi-modal assistant device), locking/sleeping of the client device between sessions, change of client devices used to interface with one or more instances of automated assistant 120, and so forth.

Natural language processor 122 (alternatively referred to as a "natural language understanding engine") of automated assistant 120 processes free form natural language input generated by users via client devices $106_{1-N}$ and in some implementations may generate annotated output for use by one or more other components of automated assistant 120. For example, the natural language processor 122 may process natural language free-form input that is generated by a user via one or more user interface input devices of client device $106_1$. The generated annotated output may include one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In some implementations, dialog state tracker 124 may be configured to keep track of a "dialog state" that includes, for instance, a belief state of a one or more users' goals (or "intents") over the course of a human-to-computer dialog session, across multiple dialog sessions, and/or during a conference dialog session. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 126 may be configured to map a current dialog state, e.g., provided by dialog state tracker 124, to one or more "responsive actions" of a plurality of candidate responsive actions that are then performed by automated assistant 120. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 120 outputting additional natural language dialog. This responsive dialog may include, for instance, requests that the user provide parameters for some action (i.e., fill slots) that dialog state tracker 124 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), and so forth.

In various implementations, content display engine 130 may be configured to select content to render using client devices 106 equipped with displays 111, such as the standalone multi-modal assistant device 106$_N$. Content display engine 130 may select for display one or both of general purpose content and what is referred to herein as "targeted content." General purpose content may include graphical elements (e.g., text, tiles, animations, cards, etc.) that represent data items not targeted towards a specific person(s). It may include things like weather-related information, general news stories, jokes, trivia items, etc.

Targeted content, by contrast, is directed to one or more specific people. For example, in FIG. 1, a user account engine 132 may be configured to provide automated assistant 120 with access to content, e.g., stored in user profile index 134 or elsewhere, that is controlled by one or more so-called "registered users." A registered user may have an online profile, e.g., stored in index 134, that includes information associated with and/or otherwise under the registered user's control. This may include a wide variety of information, such as and online calendar of the registered user, the registered user's emails, the registered user's social media account and/or activity, the registered user's text messages, preferences of the registered user, interests of the registered user, documents created and/or at least partially controlled by the registered user, smart appliances (e.g., lights, locks, thermostats) that are controllable by the registered user, tasks/reminders associated with the registered user, media libraries accessible to the registered user, data indicative of past dialog sessions between the registered user and automated assistant 120 (e.g., transcripts, discussed topics, conversational context, etc.), current and/or past locations of the registered user (e.g., generated by position coordinate sensors of one or more devices operated by the registered user), and so forth. Not all information associated with registered users needs to be stored in index 134; this information may additionally or alternatively be stored elsewhere. A user's account may be "registered" in that it is "registered" with automated assistant 120, so that automated assistant 120 is able to access the user-controlled resources.

In various implementations, content display engine 130 may be configured to access (e.g., pull from, be pushed) information associated with registered users' accounts (i.e., associated with their online profiles). For example, content display engine 130 may obtain data items such as upcoming events from a registered user's online calendar, reminders from the registered user's reminder list, a shopping list of the registered user, past media consumption by the registered user (e.g., songs listened to, videos watched, etc.), social media posts created by and/or related to the registered user, and so forth. These data items may be used, e.g., by content display engine 130, to generate targeted graphical elements that may be displayed, e.g., on display 111 of standalone multi-modal assistant device 106$_N$. While content display engine 130 is depicted as part of cloud-based automated assistant components 119, this is not meant to be limiting. In various implementations, content display engine 130 may be implemented in whole or in part on a different computing system, such as on one or more client devices 106.

In various implementations, display 111 of standalone multi-modal assistant device 106$_N$ may be transitioned from an inactive state (e.g., sleep, using little or no power) to an active state (e.g., rendering content) in response to detection of a person nearby. Standalone multi-modal assistant device 106$_N$ may rely various sensors to detect nearby persons, such as PIR sensors, microphones (to detect noise), cameras, signals emitted by devices carried by persons, and so forth.

Figure 2:
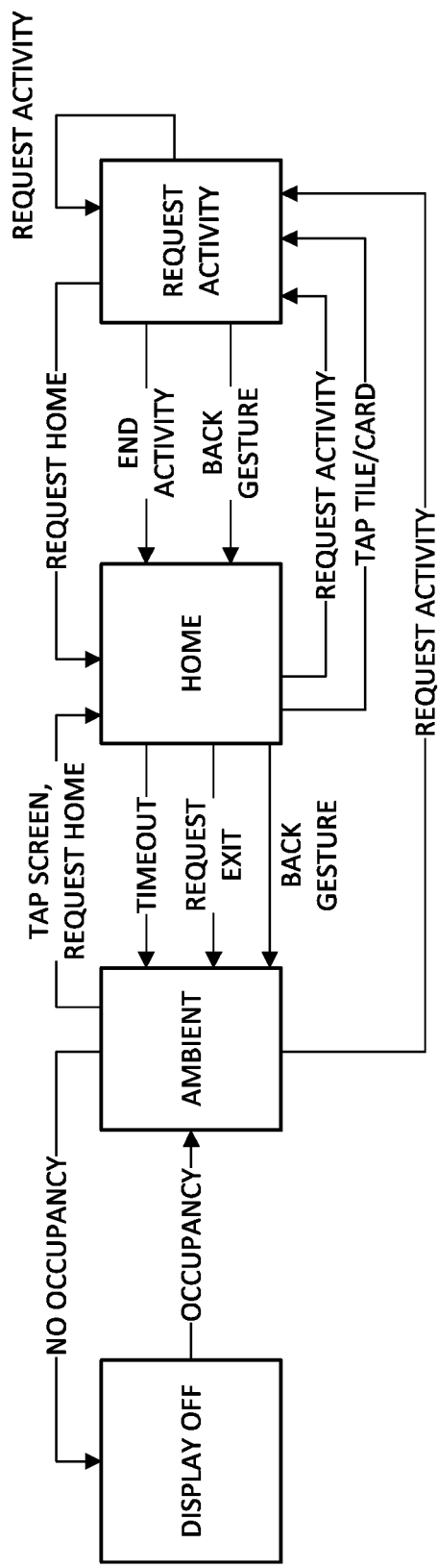
FIG. 2 depicts an example state machine that may be implemented in accordance with various implementations.

FIG. 2 depicts one example state diagram that may be implemented, e.g., by display 111 and/or content display engine 130, in accordance with various implementations. The state diagram includes four states, DISPLAY OFF, AMBIENT, HOME, and REQUEST ACTIVITY. The DISPLAY OFF may be the default state in which display 111 remains asleep, e.g., using little or no power. While standalone multi-modal assistant device 106$_N$ remains alone, without people nearby, DISPLAY OFF may remain the current state. In some implementations, while the current state is DISPLAY OFF, a user (who has not yet been detected as present) may still request activity from automated assistant 120, e.g., by speaking an invocation phrase followed by a specific request, which may transition the current state directly to the REQUEST ACTIVITY state.

In some implementations, when one or more persons is detected nearby (i.e., "OCCUPANCY"), the current state may be transitioned to the AMBIENT state. In the AMBIENT state, content display engine 130 may display ambient content that may be selected, for instance, based on its aesthetic appeal. For example, content display engine 130 may display one or more digital images and/or videos of scenery or other similar content that often might be displayed on a conventional computing device as a screensaver. In some implementations, if it is determined that the occupant is no longer co-present with the standalone multi-modal assistant device, e.g., for at least a predetermined time period, the current state may transition from AMBIENT back to DISPLAY OFF. As indicated in FIG. 2, in some implementations, while the current state is AMBIENT, a user may still request activity from automated assistant 120, e.g., by speaking an invocation phrase followed by a specific request, which may transition the current state to the REQUEST ACTIVITY state. In other implementations, there may be no AMBIENT state, and the current state may transition from DISPLAY OFF directly to HOME in response to detecting co-presence of a person (OCCUPANCY).

In the HOME state, content display engine 130 may display the various graphical elements representing general purpose and/or targeted data items described above. In some implementations, the data items may be displayed as cards or tiles, which may or may not be interactive (e.g., depending on whether display 111 is a touchscreen). As noted previously, data items may in some cases be ranked based on a variety of criteria, such as priorities assigned (automatically or manually) to the data items, an identity of the co-present person (if determined), time of day, time of year, and so forth. When data items are presented as cards, e.g., in a stack, the ranking may be reflected, for instance, by the top cards being highest priority, with underlying cards having relatively lower priorities. When data items are presented as tiles, e.g., occupying a portion of the display 111, the ranking may be reflected, for instance, in the placement of the tile (e.g., top left or top right may be highest priority) and/or in the size of the tile (e.g., the larger the tile, the higher the priority).

While in the HOME state, should the user engage in one or more of the graphical elements representing data items, e.g., by tapping a tile or card, the current state may transition to the REQUEST ACTIVITY state. Likewise, if the user utters a vocal request to automated assistant 120 (e.g., "OK, Assistant, what is . . . ?"), the current state may transition to the REQUEST ACTIVITY state. In some implementations, if the co-present user neither engages vocally with automated assistant 120 nor interacts with data items rendered on display 111 for at least a predetermined time interval (i.e. TIMEOUT), the current state may transition from HOME back to AMBIENT, or even to DISPLAY OFF if there is no AMBIENT state. Other events that might trigger transition from the HOME state to the AMBIENT (or DISPLAY OFF) state include but are not limited to a specific request from the user (e.g., tapping an exit button on display), a back gesture (e.g., waving a hand in front of a camera or other sensor) that may signal an intent of the co-present user to transition back to AMBIENT, etc.

In the REQUEST ACTIVITY state, in some embodiments, content related to the requested activity or task may be rendered on display 111, e.g., across the whole display or as a new data item card or tile. For example, suppose the co-present user utters a vocal request for a kitchen timer to be set for five minutes. In some implementations, the whole display, or a portion thereof (e.g., a card or tile) may display how much time is left on the kitchen timer. Suppose the co-present user utters a vocal request for information about a celebrity. In some implementations, responsive content may be provided vocally as natural language output by automated assistant 120, and/or rendered on display. In some implementations, other content related to the user's request or to the responsive content (but not necessarily specifically requested by the user) may be displayed while automated assistant 120 provides the responsive content audibly. For example, if the user asks for the celebrity's birthday, the celebrity's birthday may be output audibly, while other information about the celebrity (e.g., deeplinks to show times of movies starring the celebrity, picture(s) of the celebrity, etc.) may be rendered on display 111. In other implementations, the display 111 may remain unaltered from the HOME state while in the REQUEST ACTIVITY state (in effect not having a REQUEST ACTIVITY state), and the user may only receive audible response(s) from automated assistant 120.

The current state may be transitioned from the REQUEST ACTIVITY state back to the HOME state (or even the AMBIENT or DISPLAY OFF states) in response to a variety of events. For example, the requested activity may complete (e.g., the kitchen timer may be canceled or may elapse and be silenced by the co-present user). Other events that may trigger such a transition include a timeout, a back gesture, a specific request to go back to the HOME state, etc.

In some implementations, activities and/or tasks performed by automated assistant 120 may not be completed and/or may remain open. For example, a user could pause a song or video in the middle. As another example, a user could begin requesting a task that requires a number of slots to be filled with activity parameters, but may fail to fill all the required slots. For example, a user could begin ordering a pizza, but may stop and leave the room to ask others what toppings they would like or to request payment information from others. If enough time elapses, a timeout may occur and the current state may transition from the REQUEST ACTIVITY or HOME state back to the AMBIENT or DISPLAY OFF state.

In various implementations, targeted data items may be generated that represent the incomplete task, and corresponding graphical elements may be rendered that are interactive to complete the task. For example, when the user returns to complete the pizza order, in some implementations, a new tile or card may be rendered on display 111 that represents the incomplete order. In some cases, this new tile or card may be tapped by the user to continue the ordering process, e.g., with automated assistant 120 vocally requesting unfilled slot values (e.g., pizza toppings, payment information, etc.) from the user. In some implementations, this new data item representing the incomplete task may be targeted towards the requesting user, such that if another user enters the room and is presented with graphical elements representing data items, a graphical element representing the incomplete task data item may or may not be presented.

Figure 3:
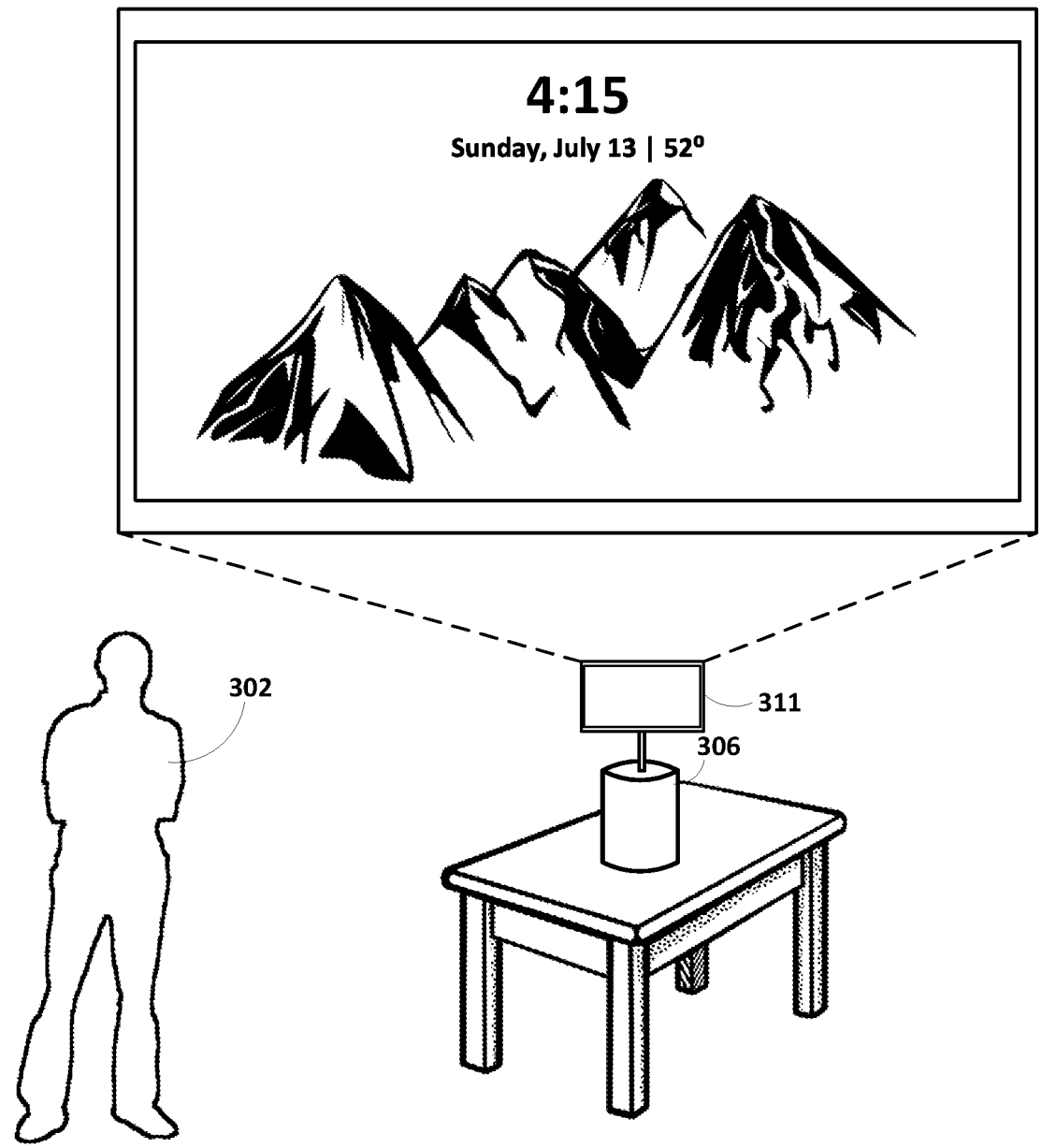
FIG. 3, FIG. 4, FIG. 5, and FIG. 6 depict examples of how techniques described herein may be employed in various scenarios, in accordance with various implementations.

FIG. 3 depicts one example of how a standalone multi-modal assistant device 306 equipped with a display 311 may operate when a user 302 is detected nearby. In this example, user 302 has merely been detected by assistant device 306, e.g., using a presence sensor (not depicted) such as a PIR sensor, a microphone, a camera, etc. In this example, standalone multi-modal assistant device 306 has transitioned from the DISPLAY OFF state described previously to the AMBIENT state in response to detecting the user's occupancy. Consequently, content rendered on display 311 includes general purpose content such as the time (4:15), the date (Sunday, July 13), and the outside temperature (52°). Also rendered on display 311 is an image of mountain scenery. As noted above, various images and/or animations may be rendered on display 311 while standalone multi-modal assistant device 306 is in the AMBIENT state, similar to conventional screen savers.

Figure 4:
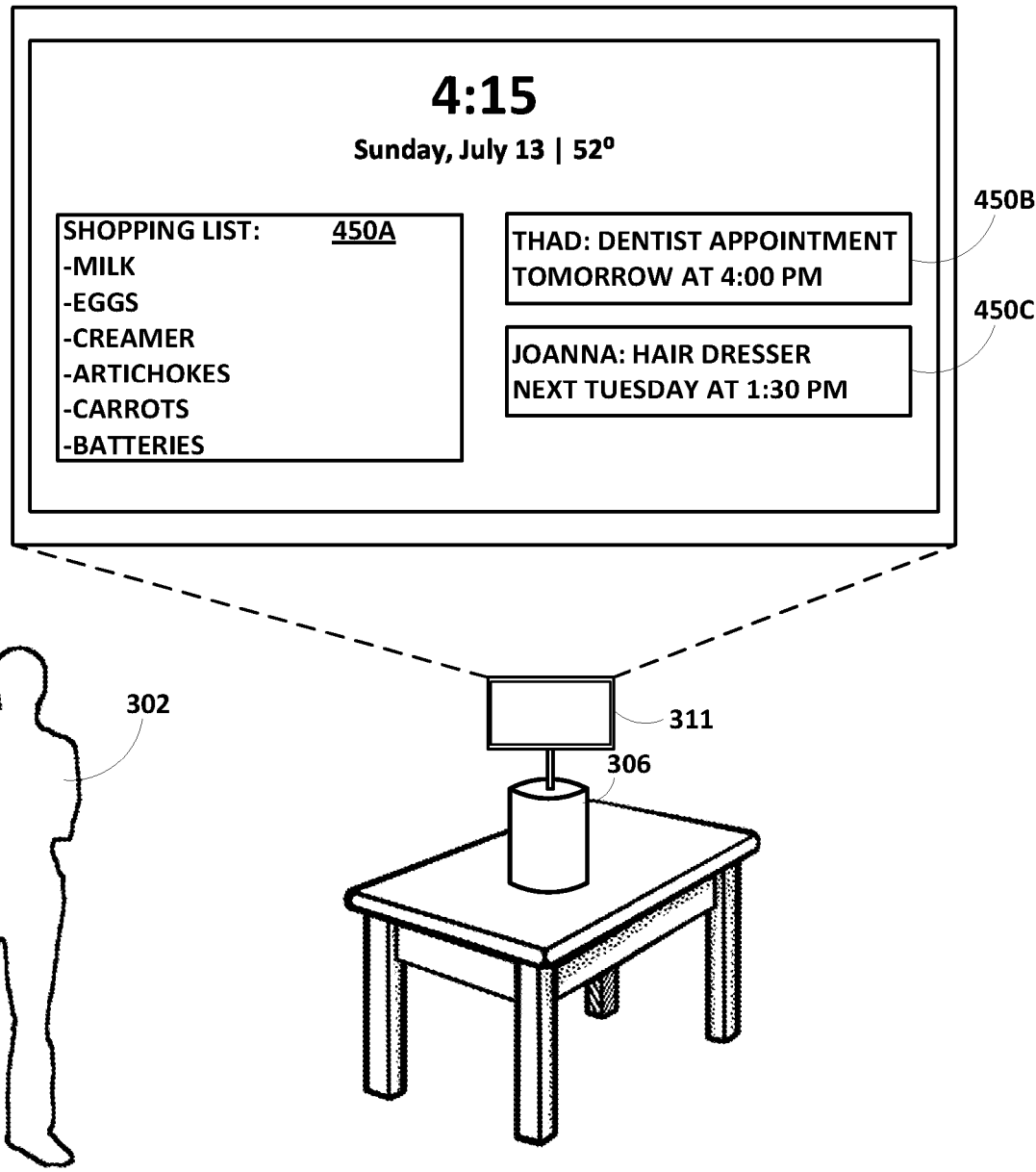

FIG. 4 depicts an example of how the standalone multi-modal assistant device 306 of FIG. 3 may operate when in the HOME state, e.g., prior to a specific identity of user 302 being determined. In some implementations, there may be no AMBIENT state, and standalone multi-modal assistant device 306 may transition directly to the HOME state depicted in FIG. 4 in response to detecting the presence of user 302. In this example, three graphical elements 450 are depicted as cards and/or tiles. A first graphical element 450A includes a shopping list. The data item underlying first graphical element 450A may be targeted data, and may in some cases be targeted towards multiple users. For example, a family may maintain a shared shopping list that any family member is able to edit (e.g., add items, remove items).

A second graphical element 450B includes a dentist appointment targeted at a registered user named Thad. A third graphical element 450C includes a hair appointment targeted at a user named Joanna. Because the identity of user 302 has not yet been determined, the graphical elements 450A-C are not ranked based on the identity of user 302. Instead, other signals may be used to rank them. For example, Thad's dentist appointment is ranked higher than (and hence, rendered above) Joanna's hair appointment because it occurs sooner.

Now, suppose standalone multi-modal assistant device 306 is able to determine that user 302 is Thad. For example, user 302 may make an utterance (directed to standalone multi-modal assistant device or otherwise) that is matched against registered user voice profiles (e.g., stored in index 134) to determine that user 302 is Thad. Additionally or alternatively, Thad (302) may be operating a mobile device such as a smart phone or smart watch that emits a signal (e.g., Wi-Fi, Bluetooth, RFID, etc.) that is detected by standalone multi-modal assistant device 306. Whichever the case, the graphical elements 450 of FIG. 4 may still be rendered in a similar arrangement because Thad's appointment was already given the highest priority due to it being scheduled the soonest. However, in some implementations, instead of graphical element 450B including the name "Thad," it might instead include the word "You" because it is known that Thad is the co-present user (this is depicted in FIG. 6).

Figure 5:
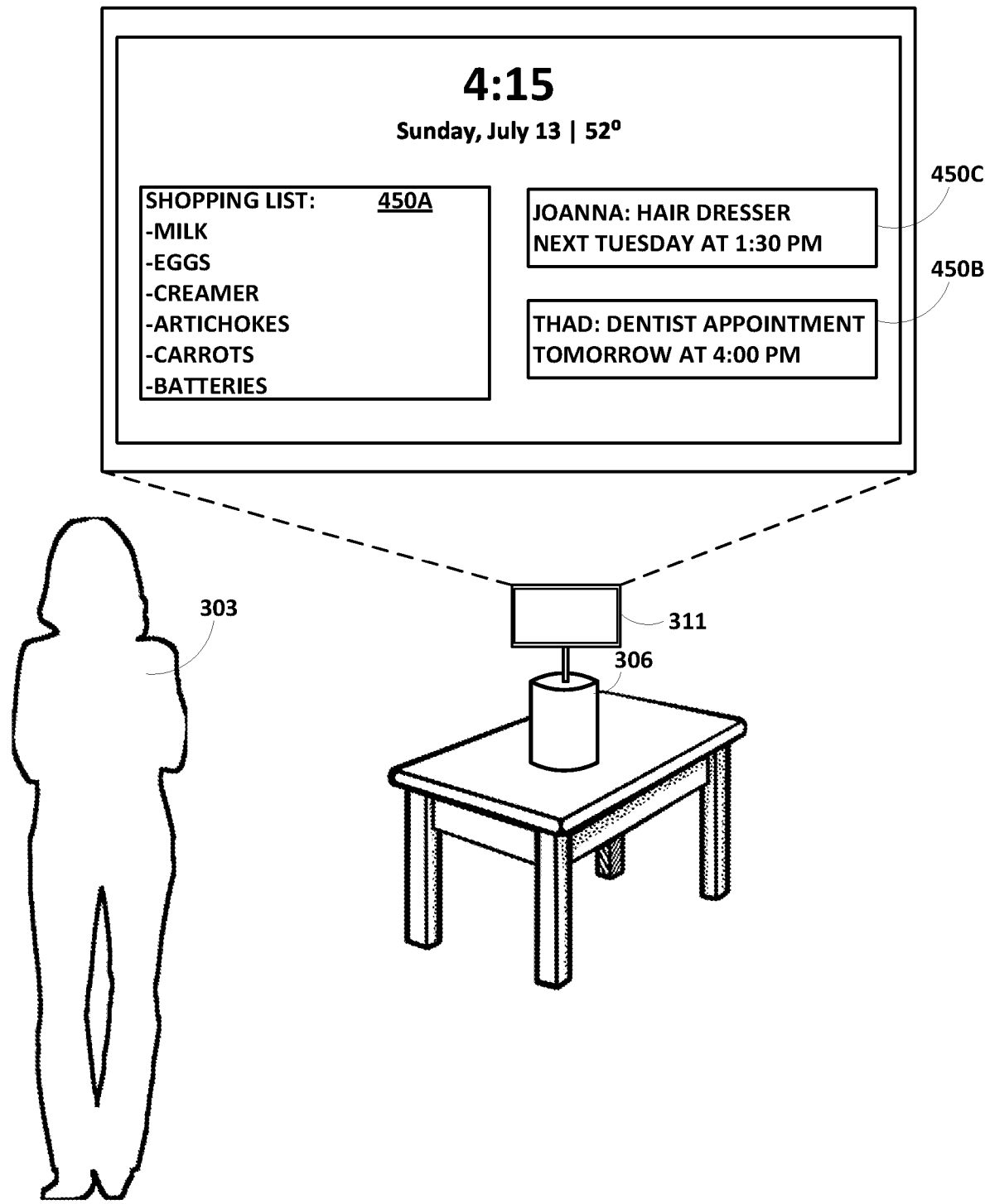

FIG. 5 depicts an example of how the standalone multi-modal assistant device 306 of FIGS. 3-4 may operate in the HOME state when a different user 303 is detected as present, and is identified as Joanna. The same graphical elements 450A-C are depicted. However, they are now ranked differently. In particular, even though Joanna's hair appointment represented by graphical element 450C occurs later than Thad's dentist appointment represented by graphical element 450B, graphical element 450C is now ranked higher because Joanna is the detected co-present user. In other words, Joanna's detected identity more heavily influences the rankings than the relative temporal urgencies associated with the appointments underlying graphical elements 450B and 450C.

Now, suppose in FIG. 4 that Thad had swiped away graphical element 450C (Joanna's hair appointment). That would have caused graphical element 450C in FIG. 4 to no longer be rendered in Thad's presence. In some cases, different graphical elements (not depicted) might have taken its place. Turning back to FIG. 5, when Joanna is detected as co-present with standalone multi-modal assistant device 306, graphical element 450C may be rendered, in spite of the fact that Thad swiped it away earlier. This is because the data item underlying graphical element 450C is targeted towards Joanna, not Thad. Consequently, while Thad swiping graphical element 450C away may prevent it from being rendered whenever Thad is detected as co-present, until Joanna swipes it away (or until enough time passes that the appointment is no longer relevant), graphical element 450C will continue to be rendered on display 311 when Joanna is detected as co-present.

Figure 6:
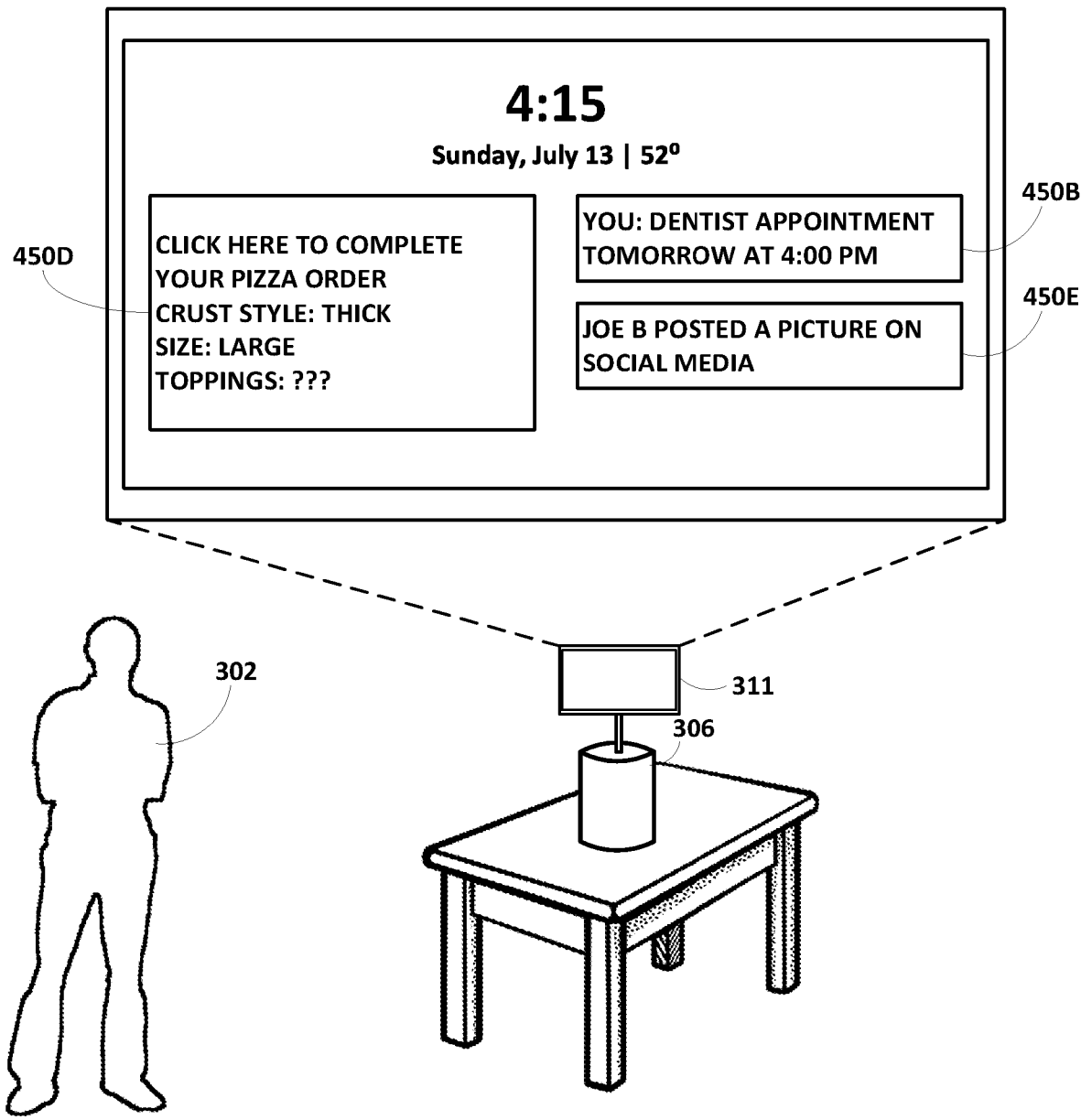

In FIG. 6, the same standalone multi-modal device 306 has identified the co-present user 302 at Thad, and is currently in the HOME state. In this example, suppose that Thad had previously engaged with automated assistant 120, either using standalone multi-modal assistant device 306 or another client device (e.g., of a coordinated ecosystem of client devices that includes standalone multi-modal assistant device 306) that provides an automated assistant interface (118), to begin the task of ordering a pizza. Suppose further that Thad did not complete the order, e.g., because he needed to ask what toppings various family members preferred. In FIG. 6, this incomplete task is presented as a graphical element 450D that includes information about the incomplete task, such as slots that have been filled (e.g., crust style=thick, size=large) and slot values that have not been filled (toppings=???). In various implementations, Thad (302) may tap on graphical element 450D to initiate completion the task. In some implementations, this may include automated assistant 120 may audibly request any missing slot values. Additionally or alternatively, in some implementations, Thad may interact with display 311 to complete the task. Also depicted in FIG. 6 is a new graphical element 450E. Graphical element 450E, which may be targeted to Thad, represents a data item in the form of a social media update posted by Thad's friend that is pushed to Thad's social media account.

Figure 7:
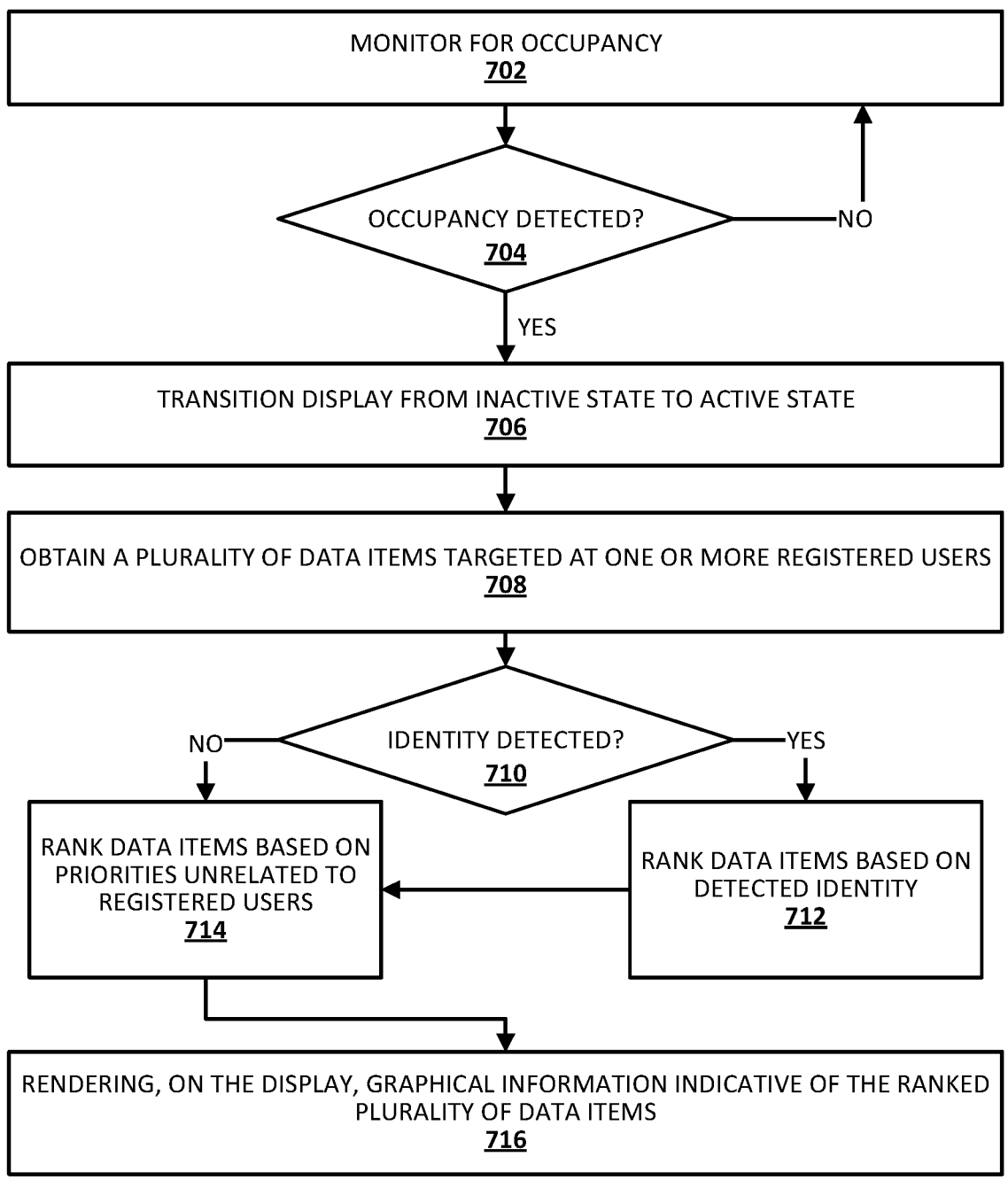
FIG. 7 depicts a flowchart illustrating an example method according to implementations disclosed herein.

FIG. 7 is a flowchart illustrating an example method 700 according to implementations disclosed herein. For convenience, the operations of the flow chart are described with reference to a system that performs the operations. This system may include various components of various computer systems, such as one or more components of computing systems that implement automated assistant 120 and/or of client devices (e.g., 106, 306). Moreover, while operations of method 700 are shown in a particular order, this is not meant to be limiting. One or more operations may be reordered, omitted or added.

At block 702, the system may perform occupancy monitoring. For example, the system may monitor a signal from a sensor such as a PIR sensor, a camera, a microphone, etc. Based on potentially abrupt changes to the signal, and/or using various conventional presence detection techniques, at block 704, the system may detect, or not detect, occupancy. For example, in some implementations, a presence sensor may be operated periodically, in addition to or instead of continuously, e.g., to save energy, computing resources, etc. During each sensor operation, if no occupancy is detected, method 700 may proceed back to block 702.

However, if occupancy of at least one person is detected at block 704, then method 700 may proceed to block 706. At block 706, the system may transition a display (e.g., 111, 311) of a standalone multi-modal device (e.g., $106_N$, 306) from an inactive state (e.g., off, sleep, etc.) to an active state. In some implementations in which an AMBIENT state is employed, the display may be populated initially with graphical information associated with general purpose data items and/or with general screen-saver-style scenery. In other implementation, the display may initially go to the HOME state.

At block 708, which is depicted after block 706 but may occur before, or concurrently therewith, the system, e.g., by way of user account engine 132, may obtain a plurality of data items targeted at one or more registered users. As noted herein, in various implementations, the one or more registered users may have accounts accessible to an automated assistant (120) that operates at least in part on the standalone multi-modal assistant device. The plurality of data items may be obtained based on the accounts of the registered users, and may include a variety of different things, such as reminders, shopping lists, news items of particular interest to a registered user, social media updates, appointments, incoming communications (e.g., emails, texts), and so forth.

At block 710, the system may determine whether the identity of the detected person is detected. For example, if the detected person speaks an utterance, the system may attempt to match the speaker's voice to a previously-stored voice profile. In some implementations, a reduced dimensionality embedding of the utterance may be generated and compared to one or more other reduced dimensionality reference embeddings generated previously from utterances provided by registered users. Additionally or alternatively, a detected person may be identified using other signals, such as a heat signature generated by a PIR sensor that may be matched to reference heat signatures, by facial recognition (when a camera is available), by detecting signals emitted by client devices carried by a person, by determining that a particular registered user is scheduled (e.g., via an online calendar) to be nearby at a certain time, etc.

If at block 710 the detected person is identified, then method 700 proceeds to block 712. At block 712, the system, e.g., by way of content display engine 130, may rank the plurality of data items based the detected identity. At block 714, the system may further rank the plurality of data items based on priorities associated with the plurality of data items that are unrelated to the one or more registered users. In some implementations, the determined identity of the detected person user may have greater influence on the rankings than the priorities that are unrelated to the one or more registered users. If at block 710 the detected person's identity is not detected, in some implementations, block 712 may be skipped and method 700 may proceed directly to block 714.

At block 716, the system may render, on the display, graphical information indicative of the ranked plurality of data items. This graphical information may include graphical elements such as cards, tiles, ticker tape, pop-up windows, notifications, etc. As noted herein, in implementations in which the display is a touchscreen, one or more of these graphical elements may be interactive, such that a user can tap on them to obtain additional information and/or perform other actions, and/or swipe them away to dismiss them.

Figure 8:
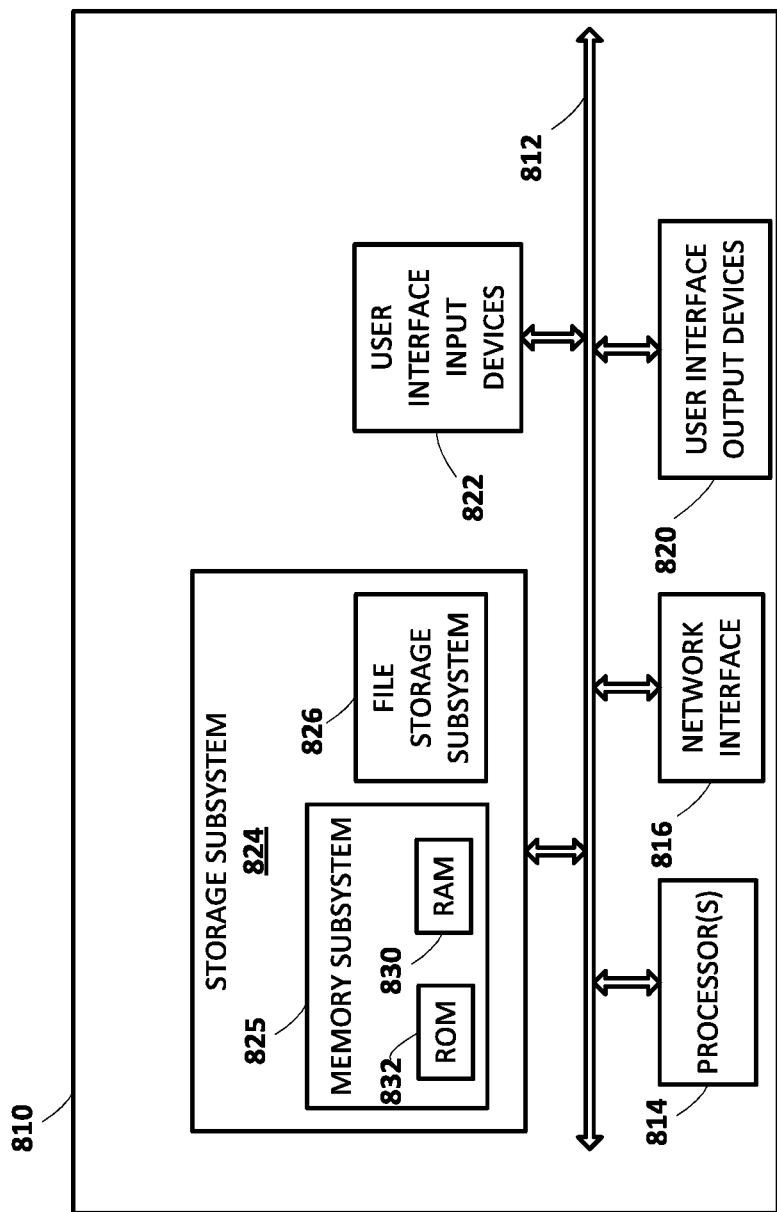
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   detecting that a first person is co-present with a standalone multi-modal assistant device, wherein the standalone multi-modal assistant device is equipped with a display;
   identifying the first person as a first registered user of a plurality of registered users with accounts accessible to an automated assistant that operates at least in part on the standalone multi-modal assistant device;
   obtaining a first plurality of data items targeted at the plurality of registered users, wherein the first plurality of data items are obtained based on the accounts of the registered users;
   rendering, on the display, a first plurality of graphical elements that correspond to the first plurality of data items;
   receiving input from the first registered user, wherein the input dismisses a given graphical element of the first plurality of graphical elements, and wherein the given graphical element is associated with a given data item of the first plurality of data items that is targeted towards a different registered user of the plurality of registered users;
   based on the input from the first registered user, removing the given graphical element from the display;
   subsequent to removing the given graphical element from the display, detecting that a second person is co-present with the standalone multi-modal assistant device;
   identifying the second person as the different registered user;
   obtaining a second plurality of data items targeted at the plurality of registered users, wherein the second plurality of data items are obtained based on the accounts of the registered users, and wherein the second plurality of data items include the given data item of the first plurality of data items that was dismissed by the first registered user;
   rendering, on the display, a second plurality of graphical elements that correspond to the second plurality of data items;
   subsequent to rendering the second plurality of graphical elements, detecting that the first person is again co-present with the standalone multi-modal assistant device;
   identifying the first person as the first registered user;
   obtaining a third plurality of data items targeted at the plurality of registered users, wherein the third plurality of data items are obtained based on the accounts of the registered users, and wherein the third plurality of data items exclude the given data item of the first plurality of data items that was dismissed previously by the first registered user; and
   rendering, on the display, a third plurality of graphical elements that correspond to the third plurality of data items.

2. The method of claim 1, further comprising transitioning the display from an inactive state to an active state based on detecting that the first or second person is co-present with the standalone multi-modal assistant device.

3. The method of claim 1, wherein detecting that the first or second person is co-present with the standalone multi-modal assistant device comprises receiving natural language input.

4. The method of claim 1, wherein detecting that the first or second person is co-present with the standalone multi-modal assistant device comprises receiving a signal from a presence sensor.

5. The method of claim 4, wherein the presence sensor comprises one or more of a camera, a microphone, and a passive infrared sensor.

6. The method of claim 1, wherein the display comprises a touchscreen and one or more of the graphical elements is interactive.

7. A system comprising one or more processors and memory operably coupled with the one or more processors, wherein the memory stores instructions that, in response to execution of the instructions by the one or more processors, cause the one or more processors to:
   detect that a first person is co-present with a standalone multi-modal assistant device, wherein the standalone multi-modal assistant device is equipped with a display;
   identify the first person as a first registered user of a plurality of registered users with accounts accessible to an automated assistant that operates at least in part on the standalone multi-modal assistant device;
   obtain a first plurality of data items targeted at the plurality of registered users, wherein the first plurality of data items are obtained based on the accounts of the registered users;
   render, on the display, a first plurality of graphical elements that correspond to the first plurality of data items;
   receive input from the first registered user, wherein the input dismisses a given graphical element of the first plurality of graphical elements, and wherein the given graphical element is associated with a given data item of the first plurality of data items that is targeted towards a different registered user of the plurality of registered users;
   based on the input from the first registered user, remove the given graphical element from the display;
   subsequent to removal of the given graphical element from the display, detect that a second person is co-present with the standalone multi-modal assistant device;
   identify the second person as the different registered user;
   obtain a second plurality of data items targeted at the plurality of registered users, wherein the second plurality of data items are obtained based on the accounts of the registered users, and wherein the second plurality of data items include the given data item of the first plurality of data items that was dismissed by the first registered user;
   render, on the display, a second plurality of graphical elements that correspond to the second plurality of data items;
   subsequent to rendition of the second plurality of graphical elements, detect that the first person is again co-present with the standalone multi-modal assistant device;
   identify the first person as the first registered user;
   obtain a third plurality of data items targeted at the plurality of registered users, wherein the third plurality of data items are obtained based on the accounts of the registered users, and wherein the third plurality of data items exclude the given data item of the first plurality of data items that was dismissed previously by the first registered user; and render, on the display, a third plurality of graphical elements that correspond to the third plurality of data items.

8. The system of claim 7, further comprising instructions to transition the display from an inactive state to an active state based on detecting that the first or second person is co-present with the standalone multi-modal assistant device.

9. The system of claim 7, wherein the first or second person is detected as co-present with the standalone multi-modal assistant device via receipt of natural language input.

10. The system of claim 7, wherein the first or second person is detected as co-present with the standalone multi-modal assistant device via receipt of a signal from a presence sensor.

11. The system of claim 10, wherein the presence sensor comprises one or more of a camera, a microphone, and a passive infrared sensor.

12. The system of claim 7, wherein the display comprises a touchscreen and one or more of the graphical elements is interactive.

13. A non-transitory computer-readable medium comprising instructions that, in response to execution of the instructions by a processor, cause the processor to:

detect that a first person is co-present with a standalone multi-modal assistant device, wherein the standalone multi-modal assistant device is equipped with a display;

identify the first person as a first registered user of a plurality of registered users with accounts accessible to an automated assistant that operates at least in part on the standalone multi-modal assistant device;

obtain a first plurality of data items targeted at the plurality of registered users, wherein the first plurality of data items are obtained based on the accounts of the registered users;

render, on the display, a first plurality of graphical elements that correspond to the first plurality of data items;

receive input from the first registered user, wherein the input dismisses a given graphical element of the first plurality of graphical elements, and wherein the given graphical element is associated with a given data item of the first plurality of data items that is targeted towards a different registered user of the plurality of registered users;

based on the input from the first registered user, remove the given graphical element from the display;

subsequent to removal of the given graphical element from the display, detect that a second person is co-present with the standalone multi-modal assistant device;

identify the second person as the different registered user;

obtain a second plurality of data items targeted at the plurality of registered users, wherein the second plurality of data items are obtained based on the accounts of the registered users, and wherein the second plurality of data items include the given data item of the first plurality of data items that was dismissed by the first registered user;

render, on the display, a second plurality of graphical elements that correspond to the second plurality of data items;

subsequent to rendition of the second plurality of graphical elements, detect that the first person is again co-present with the standalone multi-modal assistant device;

identify the first person as the first registered user;

obtain a third plurality of data items targeted at the plurality of registered users, wherein the third plurality of data items are obtained based on the accounts of the registered users, and wherein the third plurality of data items exclude the given data item of the first plurality of data items that was dismissed previously by the first registered user; and render, on the display, a third plurality of graphical elements that correspond to the third plurality of data items.

14. The non-transitory computer-readable medium of claim 13, further comprising instructions to transition the display from an inactive state to an active state based on detecting that the first or second person is co-present with the standalone multi-modal assistant device.

15. The non-transitory computer-readable medium of claim 13, wherein the first or second person is detected as co-present with the standalone multi-modal assistant device via receipt of natural language input.

16. The non-transitory computer-readable medium of claim 13, wherein the first or second person is detected as co-present with the standalone multi-modal assistant device via receipt of a signal from a presence sensor.

17. The non-transitory computer-readable medium of claim 16, wherein the presence sensor comprises one or more of a camera, a microphone, and a passive infrared sensor.

18. The non-transitory computer-readable medium of claim 13, wherein the display comprises a touchscreen and one or more of the graphical elements is interactive.

* * * * *